(12) United States Patent
Krepski et al.

(10) Patent No.: US 9,243,172 B2
(45) Date of Patent: Jan. 26, 2016

(54) PRESSURE-SENSITIVE ADHESIVES WITH MIXED PHOTOCROSSLINKING SYSTEM

(71) Applicant: 3M INNOVATIVE PROPERTIES COMPANY, St. Paul, MN (US)

(72) Inventors: Larry R. Krepski, White Bear Lake, MN (US); Babu N. Gaddam, Woodbury, MN (US); Marie Aloshyna ep Lesuffleur, Woodbury, MN (US); Arlin L. Weikel, Roberts, WI (US); Kathleen S. Shafer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/619,141

(22) Filed: Feb. 11, 2015

(65) Prior Publication Data

US 2015/0152298 A1    Jun. 4, 2015

Related U.S. Application Data

(62) Division of application No. 14/009,542, filed as application No. PCT/US2012/030639 on Mar. 27, 2012, now Pat. No. 8,980,967.

(60) Provisional application No. 61/478,969, filed on Apr. 26, 2011, provisional application No. 61/500,415, filed on Jun. 23, 2011.

(51) Int. Cl.
| | |
|---|---|
| *C08F 2/46* | (2006.01) |
| *C08F 2/50* | (2006.01) |
| *C08G 61/04* | (2006.01) |
| *C09J 133/08* | (2006.01) |
| *C09J 133/06* | (2006.01) |
| *C09J 133/10* | (2006.01) |
| *C08K 5/07* | (2006.01) |
| *C08K 5/08* | (2006.01) |
| *C08K 5/45* | (2006.01) |

(52) U.S. Cl.
CPC .............. *C09J 133/08* (2013.01); *C09J 133/06* (2013.01); *C09J 133/10* (2013.01); *C08K 5/07* (2013.01); *C08K 5/08* (2013.01); *C08K 5/45* (2013.01); *C08L 2312/06* (2013.01)

(58) Field of Classification Search
CPC ...... C09J 133/06; C09J 133/10; C09J 133/08; C08L 2312/06; C08K 5/45; C08K 5/07; C08K 5/08
USPC ............. 522/16, 12, 7, 6, 71, 189, 184, 8, 13, 522/21, 22, 1; 520/1
See application file for complete search history.

(56) References Cited

U.S. PATENT DOCUMENTS

| | | | |
|---|---|---|---|
| 4,390,565 A * | 6/1983 | Fonda | 427/504 |
| 5,753,364 A | 5/1998 | Rutherford | |
| 6,224,949 B1 | 5/2001 | Wright | |
| 6,235,922 B1 | 5/2001 | Robl | |
| 6,866,899 B2 * | 3/2005 | Wright | 427/516 |
| 2003/0130369 A1 | 7/2003 | Wright | |
| 2008/0233348 A1 | 9/2008 | Ishiwatari | |
| 2010/0137469 A1* | 6/2010 | Zhu et al. | 522/33 |
| 2010/0222447 A1* | 9/2010 | Jackson et al. | 522/37 |
| 2012/0064336 A1 | 3/2012 | Tanaka | |

FOREIGN PATENT DOCUMENTS

| | | |
|---|---|---|
| WO | WO 02-18508 | 3/2002 |
| WO | WO 2010-134521 | 11/2010 |

OTHER PUBLICATIONS

International Search Report for PCT International Application No. PCT/US2012/030639 mailed on Jul. 4, 2012, 3 pages.

* cited by examiner

*Primary Examiner* — Ling Choi
*Assistant Examiner* — Jessica E Whiteley
(74) *Attorney, Agent, or Firm* — Kent S. Kokko

(57) ABSTRACT

The present disclosure provides a method of providing an adhesive composition comprising the steps of combining crosslinkable composition including: a) a (meth)acryloyl monomer mixture with the b) photocrosslinking agent mixture, and irradiating with UVC radiation to polymerize and crosslink the composition.

12 Claims, No Drawings

PRESSURE-SENSITIVE ADHESIVES WITH MIXED PHOTOCROSSLINKING SYSTEM

CROSS REFERENCE TO RELATED APPLICATION

This application is a divisional application of U.S. patent application Ser. No. 14/009,542, filed Oct. 3, 2013, which is a national stage filing under 35 U.S.C. 371 of PCT/US2012/030639, filed Mar. 27, 2012 which claims priority to Provisional Application No. 61/478,969, filed Apr. 26, 2011 and Provisional Application No. 61/500,415, filed Jun. 23, 2011, the disclosure of which is incorporated by reference in its/their entirety herein.

BACKGROUND

Pressure-sensitive tapes are virtually ubiquitous in the home and workplace. In one of its simplest configurations, a pressure-sensitive tape includes an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted by A. V. Pocius in Adhesion and Adhesives Technology: An Introduction, 2$^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures (e.g., 70° C.) for 10,000 minutes. Increased shear holding capability has generally been accomplished by crosslinking the PSA, although considerable care must be exercised so that high levels of tack and adhesion are retained in order to preserve the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen. A particular issue for the electronics industry and other applications in which PSAs contact a metal surface is the generation of corrosive or toxic by-products and the generation of undesirable color.

Chlorinated triazine crosslinking agents are highly efficient and reliable UV crosslinkers and often used to prepare high performance PSAs. They are oxygen tolerant, have scavenging ability, and are able to cure (meth)acrylic compositions under low intensity light irradiation. However, the presence of chlorinated reagents can be undesirable because triazines are known to liberate HCl. This can cause embrittlement of some backings at elevated temperatures. The release of HCl further limits the use in the electronics industry as well as in other applications such as medical tapes.

SUMMARY

Briefly, the present disclosure provides a crosslinkable (i.e., pre-adhesive) composition comprising an acid-functional (meth)acryloyl copolymer, and a mixture of photocrosslinking agents. The photocrosslinking mixture comprises a benzophenone photocrosslinking agent and either an anthraquinone photocrosslinking agent and/or a thioxanthone photocrosslinking agent. The crosslinkable compositions, when crosslinked with the photocrosslinking mixture provides a pressure-sensitive adhesive composition with fewer of the drawbacks discussed above. Of particular note, a composition of the present disclosure is more acceptable for use in the electronics industry and other applications in which PSAs contact a metal surface because of the absence of released HCl, and further reduces the potential for the PSA to discolor.

In one embodiment, there is provided a crosslinkable composition including: a) an acid-functional (meth)acryloyl copolymer of interpolymerized monomers that include: i) a (meth)acrylic acid ester; ii) an acid-functional ethylenically unsaturated monomer; iii) an optional non-acid-functional polar monomer; iv) an optional vinyl monomer; and v) an optional multifunctional (meth)acrylate crosslinker; and b) the photocrosslinking agent mixture.

In yet another embodiment, there is provided a crosslinkable syrup composition including: a solute (meth)acryloyl copolymer comprising a) an acid-functional (meth)acryloyl copolymer of interpolymerized monomers that include: i) a (meth)acrylic acid ester; ii) an acid-functional ethylenically unsaturated monomer; iii) an optional non-acid-functional polar monomer; iv) an optional vinyl monomer; and v) an optional multifunctional (meth)acrylate crosslinker; b) the photocrosslinking agent mixture and c) a component including at least one free-radically polymerizable solvent monomer. The syrup polymer is crosslinked by a combination of UVA and UVC radiation.

In another embodiment, the present disclosure provides a method of providing an adhesive composition comprising the steps of combining a syrup polymer crosslinkable composition including: a) an acid-functional (meth)acryloyl copolymer of interpolymerized monomers that include: i) a (meth) acrylic acid ester; ii) an acid-functional ethylenically unsaturated monomer; iii) an optional non-acid-functional polar monomer; iv) an optional vinyl monomer; and v) an optional multifunctional (meth)acrylate crosslinker; with the b) photocrosslinking agent mixture, and irradiating with UVA radiation and UVC radiation to polymerize and crosslink the composition.

In another embodiment, the disclosure provides a pressure-sensitive adhesive composition comprising the acid-functional (meth)acryloyl copolymer, and the residue of the photocrosslinker mixture.

In certain embodiments, an acid-functional (meth)acryloyl copolymer interpolymerized monomers comprising: 85 to 99 parts by weight of a (meth)acrylic acid ester of a non-tertiary alcohol; 1 to 15 parts by weight of an acid-functional ethylenically unsaturated monomer; 0 to 10 parts by weight of a non-acid-functional polar monomer; 0 to 5 parts by weight of a vinyl monomer; and 0 to 5 parts of a multifunctional (meth) acrylate, based on 100 parts by weight of the monomer mixture. The adhesive copolymer will further contains the residues of the photocrosslinkers, either pendent from the (meth) acryloyl copolymer chains, or dispersed therein.

The present disclosure also provides pressure-sensitive adhesives prepared from the crosslinkable compositions (e.g., syrup compositions) described herein, as well as pressure-sensitive adhesive articles that include, for example, a coating of such adhesive. The pressure-sensitive adhesives, the crosslinked compositions, of this disclosure provide the desired balance of tack, peel adhesion, and shear holding power, and further conform to the Dahlquist criteria, i.e., the modulus of the adhesive at the application temperature, typically room temperature, is less than $3\times10^6$ dynes/cm at a frequency of 1 Hz.

In this application "pre-adhesive" refers to the mixture comprising an acid-functional copolymer and a crosslinking agent mixture that may be crosslinked to form a pressure-sensitive adhesive.

"Syrup composition" refers to a solution of a solute polymer in one or more solvent monomers, the composition having a viscosity of from 500 to 10,000 cPs at 22° C.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

The term "heterohydrocarbyl" means a saturated or unsaturated linear, branched, cyclic, or polycyclic hydrocarbon group (unless otherwise indicated, typically containing up to 30 carbon atoms) having at least one catenary carbon atom (i.e. in-chain) replaced by a catenary heteroatom such as O, S, or N.

The term "(hetero)hydrocarbyl" includes both hydrocarbyl and heterohydrocarbyl.

The term "alicyclic group" means a cyclic hydrocarbon group having properties resembling those of aliphatic groups. The term "aromatic group" or "aryl group" means a mono- or polynuclear aromatic hydrocarbon group.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present disclosure provides a pre-adhesive composition comprising an acid-functional (meth)acryloyl copolymer, which when crosslinked using the photocrosslinking agent mixture, provides a pressure-sensitive adhesive and pressure-sensitive adhesive articles having desirable properties. Preferably, the copolymer is a (meth)acrylate copolymer.

The disclosure further provides a crosslinkable syrup composition including: a solute (meth)acryloyl copolymer comprising a) an acid-functional (meth)acryloyl copolymer of interpolymerized monomers that include: i) a (meth)acrylic acid ester; ii) an acid-functional ethylenically unsaturated monomer; iii) an optional non-acid-functional polar monomer; iv) an optional vinyl monomer; and v) an optional multifunctional (meth)acrylate crosslinker; b) the photocrosslinking agent mixture comprising a benzophenone photocrosslinker, and an anthraquinone photocrosslinker and/or a thioxanthone photocrosslinker; and c) a component including at least one free-radically polymerizable solvent monomer.

The disclosure further provides a method of preparing a (meth)acrylate adhesive composition comprising:
  a) providing a (meth)acryloyl monomer mixture and a photoinitiator,
  b) irradiating the mixture with UVA to partially polymerize the monomer mixture to a syrup copolymer;
  c) adding additional photoinitiator and optionally a multifunctional (meth)acrylate, followed by;
  d) combining the syrup polymer of steps b) or c) with a photocrosslinking mixture comprising:
     i) a benzophenone photocrosslinker, and
     ii) an anthraquinone photocrosslinker and/or a thioxanthone photocrosslinker;
  e) irradiating the mixture with UVA radiation, and
  f) irradiating the mixture with UVC radiation to further crosslink the copolymer.

Steps e) and f) may be concurrent or consecutive.

The present disclosure provides a pre-adhesive composition comprising a (meth)acryloyl monomer mixture and the photocrosslinking agent mixture, which when photocrosslinked, provides a pressure-sensitive adhesive and pressure-sensitive adhesive articles. The present disclosure further provides a method of preparing an adhesive composition comprising combining syrup copolymer a (meth)acrylate monomer mixture and the photocrosslinking agent mixture, and irradiating first with UVA radiation, and in a subsequent step, irradiating with UVC radiation.

The (meth)acrylate ester monomer useful in preparing the acid functional (meth)acrylate adhesive copolymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable source, such as 2-octanol, citronellol, dihydrocitronellol.

In some embodiments it is desirable for the (meth)acrylic acid ester monomer to include a high $T_g$ monomer, have a $T_g$ of at least 25° C., and preferably at least 50° C. Suitable high Tg monomers include Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of 85 to 99.5 parts by weight based on 100 parts total monomer content used to prepare the polymer. Preferably (meth)acrylate ester monomer is present in an amount of 90 to 95 parts by weight based on 100 parts total monomer content. When high Tg (meth)acrylate monomers are included, the copolymer may include up to 30 parts by weight, preferably up to 20 parts by weight of the 85 to 99.5 parts by weight of (meth)acrylate ester monomer component.

The (meth)acryloyl copolymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 0.5 to 10 parts by weight, based on 100 parts by weight total monomer.

The polar monomers useful in preparing the copolymer are both somewhat oil soluble and water soluble. As used herein the term "polar monomers" are exclusive of acid functional monomers.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The polar monomer may be present in amounts of 0 to 10 parts by weight, preferably 0.5 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the multifunctional (meth)acrylate may be present in amounts from 0.01 to 5 parts, preferably 0.05 to 1 parts, based on 100 parts total monomers of the adhesive composition.

Generally the multifunctional (meth)acrylate is not part of the original monomer mixture, but added during optional step c) with additional photoinitiator added.

Preferably none of the monomers of the (meth)acrylate adhesive copolymer contain any substituents which would interfere with the light-absorbing capacity of the photocrosslinking agents. Such substituents are those which are chromophoric and absorb light in the range of about 240 to 400 nm and preferably, about 290-350 nm, with extinction coefficients larger than the corresponding absorptions in unsubstituted monomers.

Suitable photoinitiators for the step b) polymer can be organic, organometallic, or inorganic compounds, but are most commonly organic in nature. Examples of commonly used organic photoinitiators include benzoin and its derivatives, benzil ketals, acetophenone, acetophenone derivatives, anthraquinones, anthraquinone derivatives, benzophenone, and benzophenone derivatives. Generally, the initiator or initiator mixture will constitute from as low as about 0.001 to about 7 percent by weight of the polymerizable composition, preferably from about 0.01 to about 5 percent, and most preferably from about 0.1 to about 4 percent.

Step b) of the process comprises irradiating the monomer mixture (containing the above-described photoinitiator) with UVA radiation to partially polymerize the monomer mixture to a syrup copolymer comprising the acid functional (meth)acrylate copolymer and unpolymerized monomers. "Syrup polymer" refers to a solution of a solute polymer in one or more solvent monomers, the solution having a viscosity of from 500 to 10,000 cPs at 22° C.

The syrup polymer composition is polymerized to a useful coating viscosity with photo- or thermal initiator, which may be coated onto a substrate (such as a tape backing) and further polymerized. Partial polymerization provides a coatable solution of the acid functional (meth)acrylate solute copolymer in one or more solvent monomers. Generally, the photocrosslinking agent mixture is added to the partially polymerized composition, then coated on a suitable substrate and further polymerized. In an alternate embodiment, the photocrosslinking agent mixture is added to the mixture of polymerizable monomers, partially polymerized, coated, then further polymerized.

The degree of conversion of the monomer mixture to the syrup polymer can be monitored during the irradiation by measuring the index of refraction of the polymerizing medium as previously described. Useful coating viscosities are achieved with conversions (i.e. the percentage of available monomer polymerized) in the range of up to 30%, preferably 2-20%, more preferably from 5-15%, and most preferably from 7-12%. The molecular weight (weight average) of the solute polymer(s) is at least 100,000, preferably at least 500,000.

If desired, a chain transfer agent may be added to the monomer mixture of step a) to reduce the molecular weigh of the solute polymer in the syrup polymer composition. It has been found that the addition of chain transfer agents allows higher degrees of conversion, while still maintaining a coatable viscosity.

Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The monomer mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

When using a chain transfer agent, the syrup polymer composition is generally polymerized to higher conversions, than in the absence of chain transfer agents. The conversions may be as high as 35 wt. %, but is generally up to about 25 wt. %. This results in copolymers having generally lower molecular weights, but maintains the coatable viscosity.

In irradiating step b) the first light source is one that has the majority of its radiation occurring between about 280 to about 500 nm, preferably between about 300 to about 500 nm, more preferably between about 315 to about 440 nm, and most preferably between about 315 to about 400 nm. The first step irradiation is preferably at a low fluence rate, i.e., less than about 50 mW/cm$^2$, more preferably less than about 20 mW/cm$^2$, and most preferably less than about 10 mW/mW/cm$^2$. Examples of suitable first light sources are incandescent lamps and fluorescent lamps.

The maximum spectral output of the first light source generally occurs at a wavelength greater than about 300 nm, preferably greater than about 310 nm, and most preferably greater than about 320 nm.

In optional step c) the syrup polymer product of step b) is then combined with additional photoinitiator and optionally and preferable combined with a multifunctional (meth)acrylate, again irradiated with a UVA light source to further polymerize and crosslink the syrup polymer. It has been found that this optional step, with the addition of the multifunctional (meth)acrylate improves the shear properties of the resulting adhesives.

In step d), the syrup polymer of steps b) or c) is combined with a photocrosslinking mixture comprising:
i) a benzophenone photocrosslinker, and
ii) an anthraquinone photocrosslinker and/or a thioxanthone photocrosslinker; and then in steps e) and f), irradiating the syrup polymer with UVA and UVC radiation to further crosslink the copolymer. The irradiation may be consecutive or concurrent.

The photocrosslinking agent mixture used in step d) comprises a benzophenone photocrosslinking agent, and either an anthraquinone photocrosslinking agent or a thioxanthone photocrosslinking agent or both an anthraquinone photocrosslinking agent and a thioxanthone photocrosslinking agent.

The benzophenone photocrosslinker may be a multi-functional benzophenones of the general formula:

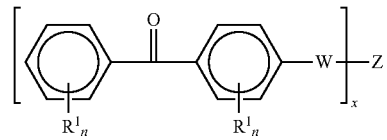

wherein:
W is —O—, —NH—, or —S—;
Z represents (hetero)hydrocarbyl organic spacer group, preferably selected from the group consisting of alkyl, aryl, aralkyl, heteroaryl, and optionally containing ester, amide, urethanes, and urea functional groups.
x is at least 2, preferably 2-6;
each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide,
and n is 0 to 4. In one preferred embodiment, W is —O—; Z is —(CH$_2$)$_{2-12}$—; and n is 2.

Specific examples of multi-functional benzophenones include 1,5-bis(4-benzoylphenoxy)pentane, 1,9-bis(4-benzoylphenoxy)nonane, and 1,11-bis(4-benzoylphenoxy)undecane.

In an alternate embodiment, the benzophenone photocrosslinker is a monobenzophenone of the formula:

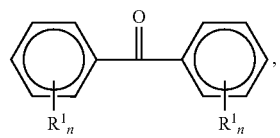

wherein each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide.

Specific examples of monofunctional benzophenones include benzophenone, 4-phenylbenzophenone, 4-methoxybenzophenone, 4,4'-dimethoxybenzophenone, 4,4'-dimethylbenzophenone, 4-methylbenzophenone, 4-(2-hydroxyethylthio)-benzophenone, and 4-(4-tolylthio)-benzophenone.

The anthraquinone photocrosslinker is of the formula

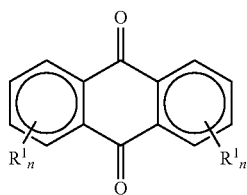

where each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide, and n is 0 to 4.

Representative examples of useful anthraquinone photocrosslinkers include anthraquinone, 2-methyl anthraquinone, 2-t-butyl anthraquinone, 2-ethyl anthraquinone, 2-phenyl anthraquinone, 1,4-dimethyl anthraquinone, 2,3-dimethyl anthraquinone, 1,2-dimethyl anthraquinone, 1-methoxy-2-methyl anthraquinone, 2-acetyl anthraquinone, and 2,6-di-t-butyl anthraquinone.

The thioxanthone photocrosslinker is of the formula:

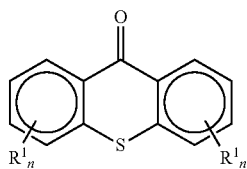

where each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide, and n is 0 to 4.

Representative examples of useful thioxanthone photocrosslinkers include thioxanthone, 2-isopropylthioxanthone, 2-chlorothioxanthone, 2-dodecylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 1-ethoxycarbonyl-3-(1-methyl-1-morpholinoethyl)-thioxanthone, 2-methyl-6-dimethoxymethylthioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 6-ethoxycarbonyl-2-methoxythioxanthone, and 6-ethoxycarbonyl-2-methylthioxanthone Particularly preferred is 2-isopropylthioxanthone. Other preferred thioxanthones includel-chloro-4-propoxythioxanthone,2-propoxythioxanthone, and 4-propoxythioxanthone.

Other useful benzophenone, thioxanthone and anthraquinone chromophores are described in U.S. Pat. No. 6,235,922 (Heilmann et al), The photocrosslinking agent mixture comprises 5 to 50 wt. % benzophenone photocrosslinker, and 50 to 95 wt. % of an anthraquinone photocrosslinker and/or a thioxanthone photocrosslinker. Preferably the photocrosslinking agent mixture comprises 20 to 50 wt. % benzophenone photocrosslinker, and 50 to 80 wt. % of an anthraquinone photocrosslinker and/or a thioxanthone photocrosslinker. It has been observed that the mixtures provide better adhesive properties than any single photocrosslinking agent. Further, it has been determined that the mixture must contain at least one benzophenone photocrosslinker. It is believed that the mixture emulates the performance of the conventional triazines crosslinking agent by having, collectively, a strong UV absorbance at 353 nanometers. incorporated herein by reference.

The radiation activatable photocrosslinking agent mixture is employed in an amount effective to crosslink the polymer so that it has adequate cohesive strength but not in an amount so large that the polymer becomes overcured. The actual amount of crosslinking agent used will vary depending on the application, the type of polymer, the type of crosslinking agent, the ease of hydrogen abstraction from the polymer, the reactivity of the radicals formed, the intensity and length of exposure of the composition to irradiation, the polymer's molecular weight, and the desired final properties of the material. Within these guidelines, the amount of crosslinking agent mixture is employed preferably is about 0.01 to 10 wt. %, more preferably about 0.1 to 5 wt. %, and most preferably about 0.1 to 1.0 wt. %, based upon the total weight of the polymer.

As each of the photocrosslinking agents of the mixture is a hydrogen-abstraction type, the resultant adhesive copolymer will have the residue of the photocrosslinking agents pendent from the (meth)acryloyl polymer chain or dispersed in the polymer matrix. By residue it is meant the by-products of the photocleavage and hydrogen-abstracting reaction in the crosslinking. For example, the residue of benzophenone is the corresponding benzohydrol, which may be pendent from the polymer chain or as a separate component in the polymer matrix. Similarly, the thioxanthones will yield thioxanthol residues and the anthraquinones will yield the anthraquinol residues.

In the second irradiating step f), the adhesive polymer is further irradiated with a UVC light source. The light source is one that has the majority of its spectral output lying between about 200 to 280 nm, preferably from about 220 to 270 nm, and more preferably from about 240 to 260 nm. In a more preferred practice of the invention, at least 80% of the emissions fall within the above ranges, and most preferred at least 90% of the emissions fall within the above ranges.

The maximum spectral output of the second light source generally occurs at a wavelength less than about 300 nm, preferably less than about 280 nm, and most preferably less than about 260 nm. Suitable sources for the second step irradiation include low pressure mercury arc lamps, excimer lamps, and excimer lasers. A preferred second light source is a low-pressure mercury arc lamp, especially a germicidal lamp where essentially all of the lamp output occurs in a narrow band centered at about 254 nm. These lamps operate at low temperature allowing their use with heat sensitive coatings and backings. Such lamps are well known industrially for their efficacy in the purification of air and water.

Fluence rates useful in the second step of the invention can be high (greater than 20 mW/cm$^2$) or low (less than 20 mW/cm$^2$). In a preferred practice of the invention, the fluence rate of the second step is at least 2 mW/cm$^2$, more preferably at least 10 mW/cm$^2$, and most preferably at least 20 mW/cm$^2$. In some cases, it may be advantageous to provide multiple lamps to achieve an optimal effect. Alternatively, a combination of sources with output below 280 nm may be utilized. During the second step irradiation, the polymerization reaction is at least substantially completed, i.e. preferably at least 95, more preferably 97, and most preferably 99 weight % monomer conversion has been achieved as well as any crosslinking, thereby substantially completing the formation of the acrylate polymer or copolymer.

It is believed that the mixture of photocrosslinkers has, collectively, a strong UV absorbance at about 260 nanometers, and can effectively be activated by UVC radiation at this wavelength.

Suitable sources for the irradiation include low pressure mercury arc lamps, excimer lamps, and excimer lasers. A preferred second light source is a low-pressure mercury arc lamp, especially a germicidal lamp where essentially all of the lamp output occurs in a narrow band centered at about 254 nm. These lamps operate at low temperature allowing their use with heat sensitive coatings and backings. Such lamps are well known industrially for their efficacy in the purification of air and water.

Useful fluence rates can be high (greater than 20 mW/cm$^2$) or low (less than 20 mW/cm$^2$). In a preferred practice of the invention, the fluence rate is at least 2 mW/cm$^2$, more preferably at least 10 mW/cm$^2$, and most preferably at least 20 mW/cm$^2$. In some cases, it may be advantageous to provide multiple lamps to achieve an optimal effect. Alternatively, a combination of sources with output below 280 nm may be utilized. During the irradiation, the polymerization reaction is at least substantially completed, i.e. preferably at least 95, more preferably 97, and most preferably 99 weight % monomer conversion has been achieved as well as any crosslinking, thereby substantially completing the formation of the acrylate polymer or copolymer.

The step of irradiation may include multiple zones varying fluence rates within the ranges of fluence rates specified. For example, the irradiation step may include several zones having a different fluence rate within the 200 to 280 nm wavelength range.

In general, the total radiation dose for each irradiation step should be between about 200-700 milliJoules/cm$^2$. Maximum efficiency and rate of polymerization is dictated by the relationship between emission properties of the radiation source and the absorption properties of the photoactive compounds employed. It is preferable that at least about 75% of the radiation be between 200 and 300 nm to maximize the absorption of the incident radiation by the photocrosslinking mixture.

The adhesives may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described adhesive compositions may be coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thickness may vary, but a coating thickness of 2-500 microns (dry thickness), preferably about 25 to 250 microns, is contemplated.

EXAMPLES

Objects and advantages of this invention are further illustrated by the following examples. The particular materials and amounts, as well as other conditions and details, recited in these examples should not be used to unduly limit this invention.

Test Methods

Peel Adhesion Test [ASTM D 3330/D 3330M-04]

Two 0.5 inch strips of adhesive coated onto Mitsubishi Hostaphan™ primed polyester film were adhered to a glass plate by rolling a 2 kg roller onto the tape. The force required to peel the tape at an angle of 180 degrees was measured in ounces per 0.5 inches with a platen speed of 90 inches per minute and 12 inches per minute. The measurements for the two tape samples were averaged and multiplied by two to provide the data in ounce by inches.

Shear Strength Test [ASTM D-3654/D 3654M 06, PSTC-7]

High Temperature Shears: A 0.5 inch strip of adhesive coated onto Mitsubishi Hostaphan™ primed polyester film was adhered by its adhesive to a stainless steel (SS) substrate and cut down to leave a 1 in by 0.5 inch sample for 70° C. temperature shear testing. A weight of 2 kg was rolled over the adhered portion. A 500 g load was attached to the tape sample for testing. Each sample was suspended until failure and/or test terminated. The time to failure as well as the mode of failure was recorded. Samples were run in triplicate and averaged for the tables below.

Room Temperature Shears: A 0.5 inch strip of adhesive coated onto Mitsubishi Hostaphan™ primed polyester film was adhered by its adhesive to a stainless steel (SS) substrate and cut down to leave a 1 in by 0.5 inch sample for room temperature shear testing. A weight of 2 kg was rolled over the adhered portion. A 1000 g load was attached to the tape sample for testing. Each sample was suspended until failure and/or test terminated. The time to failure as well as the mode of failure was recorded. Samples were run in triplicate and averaged for the tables below.

Preparation of the Syrup Copolymer

A one quart jar was charged with 450 g of isooctyl acrylate (IOA, 90 parts), 50 g of acrylic acid (AA, 10 parts), and 0.20 g of 2,2-dimethoxy-2-phenylacetophenone photoinitiator (Irgacure™ 651, Ciba Specialty Chemicals Inc, 0.04 phr). The monomer mixture was purged with nitrogen for 20 minutes then exposed to low intensity ultraviolet radiation until a coatable syrup copolymer was prepared, after which an additional 0.8 g (0.16 phr) of the photoinitiator was added.

The pre-adhesive polymer syrup was blended with various concentrations of the photocrosslinkers or with photocrosslinkers and 1,6 hexanodioldiacrylate (using 0.08 phr) as shown in Tables 2-3. The formulations were then coated on Mitsubishi Hostaphan™ primed polyester film at a 2 mil (~50 micrometers) thickness for the syrup pre-adhesive formulations and cured at two different sets of UV curing conditions: 1) UVA light, 550 mJ/cm$^2$ or 2) UVA light, 550 mJ/cm$^2$ following with germicidal (GEMS) UVC irradiation, 300 mJ/cm$^2$. The peel and shear data are shown in Tables 2-3.

For comparative purposes, control examples using 2-(3,4-dimethoxyphenyl)-4,6-bis(trichloromethyl)-1,3,5-triazine crosslinking agent were also prepared and tested. Peel Adhesion and Shear Strength were measured for tapes prepared from these adhesives as described in the test methods above.

TABLE 1

| ID | Structure | Mol. Wt. (g/mol) |
|---|---|---|
| Benzophenone (BP) | | 182.22 |
| t-butyl anthraquinone (tBA) | | 263.32 |
| Isopropyl-9H-thioxanthen-9-one (IPX) (mixture of 2- and 4-isomers) | | 254.35 |

As shown by the data in Table 2, the use of a combination of either 0.2% BP+0.08% HDDA, 0.2% IPX+0.08% HDDA, or 0.05% BP+0.1% tBA+0.05% IPX+0.08% HDDA provide adhesives with peel and shear values comparable to those values obtained with 2-(3,4-dimethoxyphenyl)-4,6-bis(trichloromethyl)-1,3,5-triazine.

TABLE 2

Curing Conditions: UVA, 550 mJ/cm² (Low Intensity)

| | | Shear | | 180° Peel on Glass, N/dm, | |
|---|---|---|---|---|---|
| | | | | at 0.305 | at 2.29 |
| Example | Additive | RT | 70° C. | m/min | m/min |
| 1 | 0.2% BP | 569 | 50 | 81 | 106 |
| 2 | 0.2% tBA | 19 | 4 | 48 | 47 |
| 3 | 0.2% IPX | 568 | 37 | 45 | 90 |
| 4 | 0.2% BP + 0.2% IPX | 358 | 34 | 71 | 103 |
| 5 | 0.1% BP + 0.1% IPX | 311 | 15 | 69 | 102 |
| 6 | 0.05% BP + 0.1% tBA + 0.05% IPX | 2424 | 961 | 46 | 82 |
| 7 | 0.2% BP + 0.08% HDDA | 10000 | 9413 | 61 | 93 |
| 8 | 0.2% tBA + 0.08% HDDA | 63 | 131 | 33 | 47 |
| 9 | 0.2% IPX + 0.08% HDDA | 10000 | 10000 | 53 | 90 |
| 10 | 0.05% BP + 0.1% tBA + 0.05% IPX + 0.08% HDDA | 10000 | 10000 | 45 | 76 |
| 11 | 0.1% 2-(3,4-dimethoxyphenyl)-4,6-bis(trichloromethyl)-1,3,5-triazine | 10000 | 10000 | 62 | 83 |

The data in Table 3 show that additional processing of the adhesives by exposure to high intensity UV provides even additional improvement in adhesive properties. Under these conditions, all combinations of photoinitiators with the chemical crosslinker (HDDA) showed excellent adhesive properties, comparable to those obtained with 2-(3,4-dimethoxyphenyl)-4,6-bis(trichloromethyl)-1,3,5-triazine.

TABLE 3

Curing Conditions: UVA, 550 mJ/cm² + UVC, GEMS, 300 mJ/cm² (Low + High Intensity)

| | | Shear | | 180° Peel on Glass, N/dm | |
|---|---|---|---|---|---|
| | | | | at 0.305 | at 2.29 |
| Example | Additive | RT | 70° C. | m/min | m/min |
| 12 | 0.2% BP | 4712 | 256 | 81 | 102 |
| 13 | 0.2% tBA | 1030 | 243 | 54 | 92 |
| 14 | 0.2% IPX | 1186 | 33 | 67 | 97 |
| 15 | 0.2% BP + 0.2% IPX | 1538 | 112 | 65 | 95 |
| 16 | 0.1% BP + 0.1% IPX | 1725 | 94 | 81 | 94 |

TABLE 3-continued

Curing Conditions: UVA, 550 mJ/cm² + UVC, GEMS, 300 mJ/cm² (Low + High Intensity)

| | | Shear | | 180° Peel on Glass, N/dm | |
|---|---|---|---|---|---|
| Example | Additive | RT | 70° C. | at 0.305 m/min | at 2.29 m/min |
| 17 | 0.05% BP + 0.1% tBA + 0.05% IPX | 10000 | 10000 | 68 | 103 |
| 18 | 0.2% BP + 0.2% IPX + 0.08% HDDA | 10000 | 10000 | 69 | 95 |
| 19 | 0.1% BP + 0.1% IPX + 0.08% HDDA | 9482 | 6037 | 68 | 88 |
| 20 | 0.05% BP + 0.1% tBA + 0.05% IPX + 0.08% HDDA | 10000 | 10000 | 62 | 92 |
| 21 | 0.1% 2-(3,4-dimethoxyphenyl)-4,6-bis(trichloromethyl)-1,3,5-triazine | 10000 | 10000 | 71 | 94 |

TABLE 4

Raw materials used for the following examples are described in the table below.

| Chemical Abbreviation | Chemical Name | Chemical Company |
|---|---|---|
| 2-EHA | 2-Ethyl hexyl acrylate | BASF, Florham Park, NJ USA |
| AA | Acrylic acid | Alfa Aesar, Ward Hill, MA USA |
| IOTG | Iso-octyl thioglycolate | Aldrich Chemical Co., Milwaukee, WI USA |
| Irg651 | 2,2-dimethoxy-2-phenylacetophenone | Ciba Specialty Chemicals, Tarrytown, NY |
| HDDA | 1,6 hexanediol diacrylate | Alfa Aesar, Lancaster, PA USA |

Preparation of the 2-EHA/AA Syrups for Samples in Tables 5 & 6.

A one quart jar was charged with 300 g of 2-ethylhexyl acrylate (2-EHA, 90 parts), 30 g of acrylic acid (AA, 10 parts), 0.274 g of iso-octyl thioglycolate (IOTG, 0.09 phr) and 0.154 g of Irgacure™ 651 (0.05 phr). The monomer mixture was mechanically shaken for 30 minutes, purged with nitrogen for 5 minutes, then exposed to low intensity ultraviolet radiation until a coatable syrup was prepared. An additional 0.48 g (0.16 phr) of the Irgacure™ 651 was added after syruping. Syrup conversion was determined to be 29% solids versus a typical 8% conversion found in standard syruping techniques.

Formulation and Coating Syrup Samples

The prepared syrup was divided in 30 g samples, to which various crosslinkers (e.g. BP, tBA, IPX, HDDA) were added as specified in Table 2-3. After mechanical rolling for 24 h, the formulations were coated on Mitsubishi Hostaphan™ primed polyester film at a 2 mil (~50 micrometers) thickness and cured by UVA light (550 mJ/cm²) or UVA light (550 mJ/cm²)+UVA/UVC (Fusion H bulb, 100 mJ/cm²×3 passes).

Peel Adhesion and Shear Strength were measured for tapes prepared from these adhesives as described in the test methods above.

TABLE 5

Adhesive formulations based on 90:10 2-EHA:AA + Irg651 (0.051 phr) + IOTG (0.091 phr) syrups with various crosslinker mixtures irradiated with UVA.

| Example | 1651 (phr) | BP (phr) | tBA (phr) | IPX (phr) | HDDA (phr) | Shear (70° C.) | Peel (0.305 m/min) (N/dm) |
|---|---|---|---|---|---|---|---|
| 1 | 0.16 | 0.2 | | | | 1ᶜ | 101 |
| 2 | 0.16 | | 0.2 | | | 1ᶜ | 92 |
| 3 | 0.16 | | | 0.2 | | 1ᶜ | 105 |
| 4 | 0.16 | 0.2 | | | 0.08 | 12ᶜ | 87 |
| 5 | 0.16 | | 0.2 | | 0.08 | 43ᶜ | 83 |
| 6 | 0.16 | | | 0.2 | 0.08 | 23ᶜ | 87 |
| 7 | 0.16 | 0.05 | 0.1 | 0.05 | | 2ᶜ | 111 |
| 8 | 0.16 | 0.05 | 0.1 | 0.05 | 0.08 | 22ᶜ | 80 | c stands for cohesive mode of failure

TABLE 6

Adhesive formulations based on 90:10 2-EHA:AA + Irg651 (0.051 phr) + IOTG (0.091 phr) syrups with various crosslinker mixtures irradiated with UVA + Fusion lamp (UVA + UVC).

| Example | 1651 (phr) | BP (phr) | tBA (phr) | IPX (phr) | HDDA (phr) | Shear (70° C.) | Peel (0.305 m/min) (N/dm) |
|---|---|---|---|---|---|---|---|
| 9 | 0.16 | 0.2 | | | | 10000 | 44 |
| 10 | 0.16 | | 0.2 | | | 10000 | 40 |
| 11 | 0.16 | | | 0.2 | | 2ᶜ | 44 |
| 12 | 0.16 | 0.2 | | | 0.08 | 10000 | 43 |
| 13 | 0.16 | | 0.2 | | 0.08 | 10000 | 39 |
| 14 | 0.16 | | | 0.2 | 0.08 | 10000 | 40 |
| 15 | 0.16 | 0.05 | 0.1 | 0.05 | | 10000 | 35 |
| 16 | 0.16 | 0.05 | 0.1 | 0.05 | 0.08 | 10000 | 38 | c stands for cohesive mode of failure.

The invention claimed is:

1. A crosslinkable syrup composition comprising:
   a) solute copolymer comprising interpolymerized monomer units of:
      i) a (meth)acrylic acid ester monomer;
      ii) an acid-functional ethylenically unsaturated monomer;
      iii) an optional non-acid-functional polar monomer;
      iv) an optional vinyl monomer;

b) a photocrosslinking agent mixture comprising a benzophenone photocrosslinker, and an anthraquinone photocrosslinker and/or a thioxanthone photocrosslinker; and c) a component including at least one free-radically polymerizable solvent monomer.

2. The crosslinkable syrup composition of claim 1 wherein the photocrosslinking mixture comprises
   1) 5 to 50 wt. % benzophenone photocrosslinker, and
   2) 50 to 95 wt. % of either an anthraquinone photocrosslinker or a thioxanthone photocrosslinkers.

3. The crosslinkable syrup composition of claim 1 wherein the photocrosslinking mixture comprises
   1) 20 to 50 wt. % benzophenone photocrosslinker, and
   2) 50 to 80 wt. % of either an anthraquinone photocrosslinker or a thioxanthone photocrosslinkers.

4. The crosslinkable syrup composition of claim 1 comprising 0.01 to 10 wt % of the photocrosslinking mixture relative to the solvent monomer component.

5. The crosslinkable syrup composition of claim 1 comprising 0.1 to 5 wt % of the photocrosslinking mixture relative to the solvent monomer component.

6. The crosslinkable syrup composition of claim 1 wherein the photocrosslinking mixture comprises a benzophenone photocrosslinker, and an anthraquinone photocrosslinker.

7. The crosslinkable syrup composition of claim 1 wherein the photocrosslinking mixture comprises a benzophenone photocrosslinker and a thioxanthone photocrosslinker.

8. The crosslinkable syrup composition of claim 1 wherein the photocrosslinking mixture comprises a benzophenone photocrosslinker, a thioxanthone photocrosslinker, and an anthraquinone photocrosslinker.

9. The crosslinkable syrup composition of claim 1 wherein the solvent monomer component comprises:
   i. 85 to 99.5 parts by weight of an (meth)acrylic acid ester of non-tertiary alcohol;
   ii. 0.5 to 15 parts by weight of an acid functional ethylenically unsaturated monomer;
   iii. 0 to 10 parts by weight of a non-acid functional, ethylenically unsaturated polar monomer;
   iv. 0 to 5 parts vinyl monomer; and
   v. 0 to 5 parts of a multifunctional (meth)acrylate;
   based on 100 parts by weight total monomer.

10. The crosslinkable syrup composition of claim 1 wherein the solvent monomer component comprises 0.01 to 5 parts of the multifunctional (meth)acrylate, based on 100 parts total monomers.

11. The crosslinkable syrup composition of claim 10 further comprising a chain transfer agent.

12. An adhesive composition comprising a (meth)acryloyl copolymer comprising:
   a) an acid-functional (meth)acryloyl copolymer of interpolymerized monomers that include:
      i) a (meth)acrylic acid ester;
      ii) an acid-functional ethylenically unsaturated monomer;
      iii) an optional non-acid-functional polar monomer;
      iv) an optional vinyl monomer; and
      v) an optional multifunctional (meth)acrylate crosslinker, and
   b) the residues of a benzophenone photocrosslinker, and an anthraquinone photocrosslinker and/or a thioxanthone photocrosslinker in the copolymer matrix.

* * * * *

UNITED STATES PATENT AND TRADEMARK OFFICE
CERTIFICATE OF CORRECTION

PATENT NO. : 9,243,172 B2
APPLICATION NO. : 14/619141
DATED : January 26, 2016
INVENTOR(S) : Larry Krepski It is certified that error appears in the above-identified patent and that said Letters Patent is hereby corrected as shown below:

In The Specification

Column 12,
Line 62, delete "(-50" and insert -- (~50 --, therefor.

Column 16,
Line 36, after "failure" insert -- . --.

In The Claims

Column 17,
Line 18, in Claim 4, delete "wt %" and insert -- wt. % --, therefor.
Line 21, in Claim 5, delete "wt %" and insert -- wt. % --, therefor.

Signed and Sealed this
Twenty-third Day of August, 2016

Michelle K. Lee
*Director of the United States Patent and Trademark Office*